June 26, 1951
A. MOSCH
2,558,265
POCKET UTENSIL COMPACT
Filed Jan. 22, 1946
2 Sheets-Sheet 1
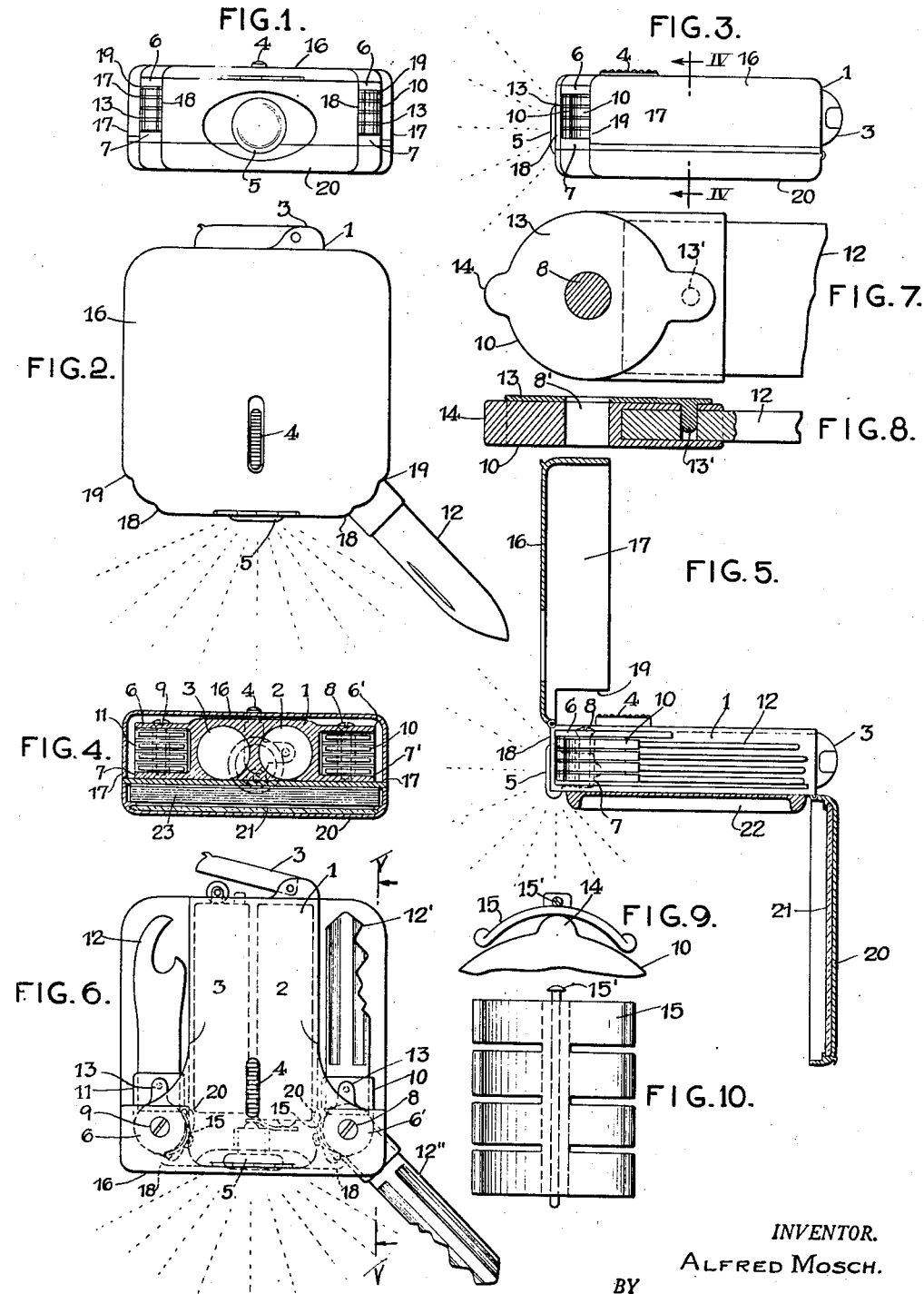
INVENTOR.
ALFRED MOSCH.
BY
K. A. Mayr
ATTORNEY.

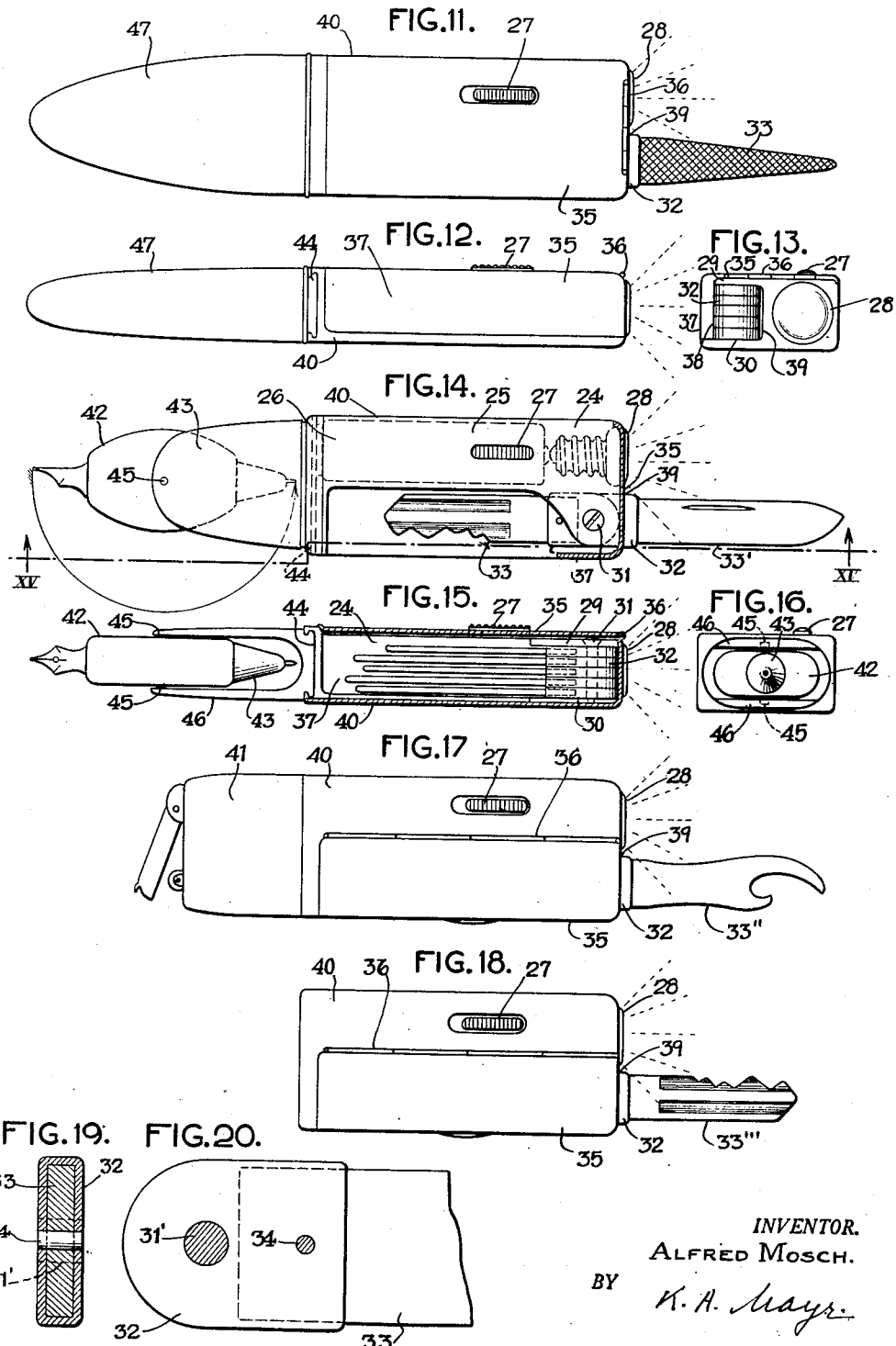

Patented June 26, 1951

2,558,265

UNITED STATES PATENT OFFICE 2,558,265

POCKET UTENSIL COMPACT

Alfred Mosch, New York, N. Y.

Application January 22, 1946, Serial No. 642,615

2 Claims. (Cl. 206—38)

The present invention relates to a device for holding utensils and tools, more particularly for holding, serving as a handle, and encasing, like a compact, a plurality of utensils so that they can be safely carried in a pocket or handbag.

This application for Letters Patent is a continuation in part of my copending application Ser. No. 554,208, filed September 15, 1944, which has matured into Patent No. 2,412,056 on September 3, 1946.

Though utilizing certain fundamental ideas disclosed in my Patent No. 2,412,056 and in my Patent No. 2,371,308 of March 13, 1945, the object of the present invention is to provide useful and new variations of the device, as well as simplifications and improvements.

An object of the invention is the provision of a new configuration of the casing and cover members of the device, eliminating dead spaces and rendering the device more compact and serviceable.

Another object of the invention is the provision of the device in a form adapted particularly to be carried in a vest pocket.

A further object of the invention is the provision of detachable means for supporting additional utensils in ready-for-use positions.

An object of the invention is the provision of an attachment comprising revolvably supported utensils, such as a combination pen and pencil.

An object of the invention is the provision of an improved holding means for swingably, removably and exchangeably connecting the utensils to the body member.

An object of the invention is the provision of new spring retainer means for controlling the operation of the holding means.

Further and other objects and advantages of the invention will be apparent from the accompanying specification and claims and shown in the drawings which, by way of illustration, show what I now consider to be a preferred embodiment of my invention.

In the drawings:

Fig. 1 is a front view of the device according to the invention.

Fig. 2 is a top view of the device illustrated in Fig. 1.

Fig. 3 is a side view of the device shown in Figs. 1 and 2.

Fig. 4 is a section through the device shown in Figs. 1 to 3 taken along line IV—IV in Fig. 3, and with the utensils removed.

Fig. 5 is a section through the device shown in Figs. 1 to 4 with the covers open and taken along line V—V of Fig. 6.

Fig. 6 is a top view of the device according to Figs. 1 to 5 with the top cover open.

Fig. 7 is a top view of the new utensil holding means.

Fig. 8 is a longitudinal section through the holding means shown in Fig. 7.

Fig. 9 is a top view of the new spring retainer means.

Fig. 10 is a side view of the spring retainer means shown in Fig. 9.

Fig. 11 is a top view of a modification of the device according to the invention.

Fig. 12 is a side view of the device shown in Fig. 11.

Fig. 13 is a front view of the device shown in Figs. 11 and 12.

Fig. 14 is a top view of the device shown in Figs. 11 to 13 with the sheath means removed and the lid open.

Fig. 15 is a section through the device according to Figs. 11 to 14 with the sheath removed.

Fig. 16 is a rear view of the device according to Figs. 11–15 with the sheath removed.

Fig. 17 is a top view of another modification of the device shown in Figs. 11 to 16.

Fig. 18 is a side view of the device shown in Fig. 17 with the detachable utensil removed.

Fig. 19 is a section through a modified utensil holding means according to the invention.

Fig. 20 is a top view of the holding means according to Fig. 19.

Like parts are designated by like numerals in all figures of the drawings.

Referring more particularly to Figs. 1 to 10, numeral 1 designates the centrally located body member having cavities 3 for a lighter and 2 for a battery. A switch 4 is attached to the body member penetrating through the top cover 16 to the outside. A light bulb 5 is connected with battery 3 and switch 4.

The body member 1 is provided with flat, flap-like carrier portions, 6, 6' projecting from the upper surface and 7, 7' from the lower surface of member 1. These carrier portions support pin members 8 and 9. Between the upper and lower flat portions 6 and 7 and filed on the pin members 8 and 9 are holding or lock-pocket means 10 and 11 receiving the specially formed ends of the utensils 12. The pins 8 and 9 do not extend through the utensils. The latter are provided with a hole or cavity into which extends a protuberance 13' projecting from an ear of washer member 13 which is placed between two holding members 10.

Specially formed plate spring members 15 are disposed adjacent the rear portion of the holding members 10 and held between the ears 6, 7 of the body member by means of a pin 15′. The curvature of the plate springs 15 has a smaller radius than the rear portion of members 10 and the latter have a protruding portion 14 which upon abutment of an edge of spring 15 bends the spring and slides therealong when the utensils are brought into operating position. When they are fully swung into operating position, such as the key 12″ in Fig. 6, one edge of the spring snaps back and nose 14 abuts it, whereby the utensil is held in operating position.

The top cover 16 with its flap-like portions 17 fits closely over the body member and the utensils when the latter are in rest position and has substantially rectangular configuration. The lateral flap portions 17 leave openings at the front corners through which the locks or holding means 10 and 11 are visible when the utensils are in rest position and through which the locks extend when the utensils are in operating position. When it is desired to use a utensil, the cover 16 is lifted and the selected utensil swung out until it abuts one edge of spring 15. Then the cover is closed and the holding means 10 (or 11) of the selected utensil is held firmly in position between edge 18 of the body member and the edge portion 19 of the cover. When in position for use, the utensils extend substantially diagonally from the box formed by covers 16 and 20 whereby the box forms a handle for the utensils which fits conveniently in the hand of the user. Both covers are hinged to the body member and the lower cover may have a mirror 21 at its inside. A powder container 22, as in Fig. 5, or a note book 23, as in Fig. 4, may be removably attached.

Figures 11 to 20 illustrate a modified utensil compact. The body member 24 has a cavity 25 holding a battery 26. A switch 27 which penetrates through cover 35 to the outside, as well as a light bulb 28 are connected with the body member. The latter is provided with an upper ear portion 29 and a lower ear portion 30 which ear portions give support to pin member 31. Locks or pocket members 32 are filed on pin 31 for individually holding the utensils 33 which are held in the pockets by pins 34 fitted in the walls of pocket members 33 and extending through the specially shaped root portions of the utensils.

The cover 35 hinged at 36 to the body member has a flap portion 37 covering the tools 33, when they are in rest position and leaving an opening at the front end corner, through which the locks or pockets 32 penetrate, when the utensils are in operating position. When cover 35 is lifted and a selected utensil swung to the outside into operating position, the lock including the utensil is held firmly between marginal portion 38 of the closed cover and marginal portion 39 of casing 40.

An additional utensil such as a cigaret lighter 41, as in Fig. 17, or a combination swivel type fountain pen and pencil 42 and 43, as in Figs. 11 to 15, may be removably attached to the end of the casing by a slide-like means 44. The combination pen and pencil can be swung around pivot 45 to bring either into operating position. When this device is not used it is covered by a sheath 47.

The cover 35 may be hinged to the long sides of the body member 24, as shown in Figs. 17 and 18.

While I believe the above described embodiments of my invention to be preferred embodiments, I wish it to be understood that I do not desire to be limited to the exact details of design and construction shown and described, for obvious modifications will occur to a person skilled in the art.

I claim:

1. A pocket utensil holder comprising, in combination, a substantially box-like body member; spaced, substantially parallel ear portions extending laterally from said body member; a plurality of pocket members pivotally mounted between said ear portions; a plurality of utensils having root portions individually inserted in said pocket members; and pins extending through said pocket members and said root portions for securing said utensils to said pocket members.

2. A pocket utensil holder comprising, in combination, a substantially box-like body member; spaced, substantially parallel ear portions extending laterally from said body member; a plurality of pocket members pivotally mounted between said ear portions and having rectangular cavities; a plurality of utensils having root portions individually conforming with said cavities and inserted in said pocket members; and means individually removably securing said root portions in said cavities independently of the pivotal mounting of the pocket members.

ALFRED MOSCH.

REFERENCES CITED

The following references are of record in the file of this patent:

UNITED STATES PATENTS

| Number | Name | Date |
|---|---|---|
| 300,858 | Feicker | June 24, 1884 |
| 464,405 | Widmann | Dec. 1, 1891 |
| 666,720 | Wetmore | Jan. 29, 1901 |
| 1,368,944 | Kurose | Feb. 15, 1921 |
| 1,486,294 | Morris | Mar. 11, 1924 |
| 1,530,070 | Bovee | Mar. 17, 1925 |
| 1,642,791 | Skorepa | Sept. 20, 1927 |
| 2,110,999 | Miga | Mar. 15, 1938 |
| 2,208,372 | Kirkpatrick | July 16, 1940 |
| 2,371,308 | Mosch | Mar. 13, 1945 |
| 2,412,056 | Mosch | Dec. 3, 1946 |